United States Patent
Gebhardt et al.

[11] Patent Number: 6,044,833
[45] Date of Patent: Apr. 4, 2000

[54] BAKING OVEN

[75] Inventors: Ralf Gebhardt; Bernd Dannenhauer, both of Dinkelsbühl; Frank Blümel, Mönchsroth, all of Germany

[73] Assignee: Werner & Pfleiderer Lebensmitteltechnik GmbH, Dinkelsbühl, Germany

[21] Appl. No.: 09/260,127

[22] Filed: Mar. 1, 1999

[30] Foreign Application Priority Data

Mar. 9, 1998 [DE] Germany ............... 198 09 980

[51] Int. Cl.[7] .................. A47J 37/00; F24C 15/32
[52] U.S. Cl. ................ 126/21 A; 126/21 R; 99/447
[58] Field of Search .................. 126/21 R, 21 A, 126/110 R, 116 R, 19 R, 273 R; 34/191, 225; 432/200; 99/474, 443 C, 477; 219/388, 400, 401

[56] References Cited

U.S. PATENT DOCUMENTS

| 4,785,151 | 11/1988 | Voegtlin . | |
|---|---|---|---|
| 4,974,579 | 12/1990 | Shellenberger et al. | 126/110 R |
| 5,129,384 | 7/1992 | Parks . | |
| 5,617,839 | 4/1997 | Jennings . | |
| 5,845,631 | 12/1998 | Kleva et al. | 126/21 A |

FOREIGN PATENT DOCUMENTS 30 42 176   5/1981   Germany .

*Primary Examiner*—James C. Yeung
*Attorney, Agent, or Firm*—Browdy and Neimark

[57] ABSTRACT

A baking oven comprises a re-circulation air heater which comprises a burner with a combustion chamber and a cross-counterflow heat exchanger disposed downstream thereof. This heat exchanger comprises serpentine heat transfer tubes which are connected to a single flue gas supply channel and a single flue gas discharge channel. The heat exchanger is fixed at only a single fixing spot in each coordinate direction of a Cartesian coordinate system.

10 Claims, 2 Drawing Sheets

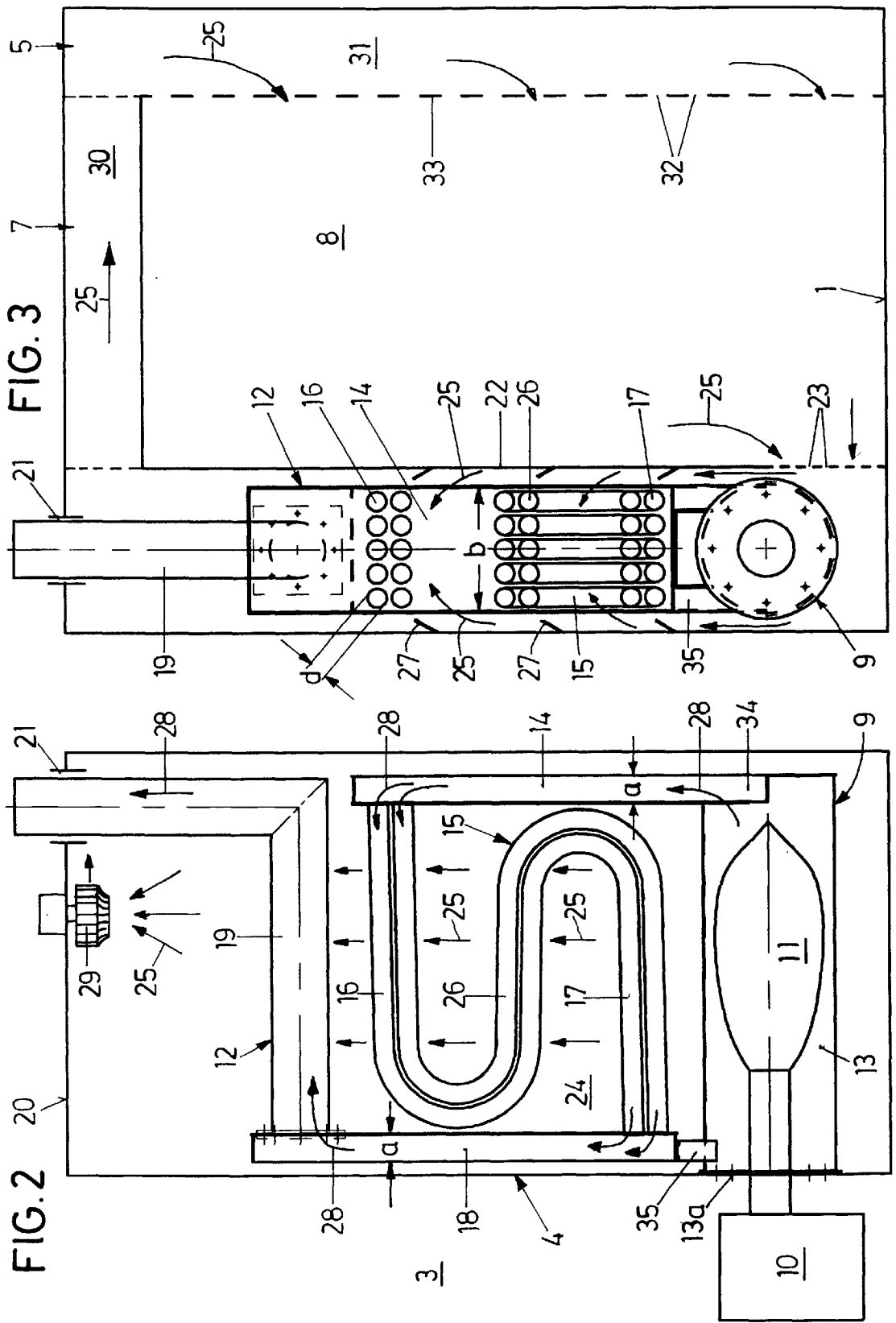

BAKING OVEN

BACKGROUND OF THE INVENTION

1. Field of the Invention

The invention relates to a baking oven comprising a baking chamber; a recirculation air heater which comprises a burner with a combustion chamber and a heat exchanger disposed downstream of the combustion chamber in the way of the re-circulation air.

2. Background Art

A baking oven of the generic type known from U.S. Pat. No. 5,617,839 comprises a cross-flow operated heat exchanger. To this end, a flue gas supply channel is disposed downstream of the combustion chamber; heat exchanger tubes extending parallel to the combustion chamber and transversely to the flow of re-circulation air discharge from the flue gas supply channel. They are connected to a deflection box from which again a second bunch of heat exchanger tubes discharges, opening into a flue gas discharge channel. Connected to the latter is a flue gas tube which leads to a chimney. The heat transfer effect leaves much to be desired. Considerable pressure drops are occasioned by the multiple deflections. The high number of heat exchanger tubes and the welding joints conditioned thereby render manufacture complicated and expensive, and moreover there is a high risk of weld seam fissuring, as the entire heat exchanger is problematic with a view to stress-corrosion conditioned by heat expansion.

SUMMARY OF THE INVENTION

It is the object of the invention to embody a baking oven of the generic type such that the heat exchanger is especially easy to manufacture, ensures excellent heat transfer and is not trouble-prone.

According to the invention, this object is attained by the heat exchanger being a cross-counterflow heat exchanger having serpentine heat transfer tubes which, on the one hand, are connected to a flue gas supply channel connected to the combustion chamber and, on the other hand, to a flue gas discharge channel. Due to the fact that the heat transfer tubes are of serpentine shape and in particular preferably S-shaped, they are resilient and therefore able to absorb heat expansion stresses. Due to the fact that only one flue gas supply channel and one flue gas discharge channel is provided without any intermediate deflection boxes, pressure drops are especially low and also the number of joints between the heat transfer tubes and the flue gas supply channel on the one hand and the flue gas discharge channel on the other are minimized.

The measures according to which the cross-counterflow heat exchanger, which substantially comprises the flue gas supply channel, the heat transfer tubes and the flue gas discharge channel, is fixed only at one fixing spot in each coordinate direction of a Cartesian coordinate system, and in particular the measures according to which the cross-counterflow heat exchanger is fixed only at one fixing spot, enable the heat exchanger according to the invention to expand in all directions without there being any stresses within the heat exchanger which might result in damaging. The further development according to which the heat transfer tubes, close to each other, are connected to the flue gas supply channel or the flue gas discharge channel, helps attain that heat expansions within the heat transfer tubes and within the flue gas supply channel or the flue gas discharge channel, respectively, are resiliently compensated in the entire system. This applies in particular to the further development according to which the cross-counterflow heat exchanger is additionally supported by at least one slide bearing. The further development according to which each of the heat transfer tubes is of one-piece design helps raise the production and also the operational safety.

The advantageous development according to which the flue gas supply channel and/or the flue gas discharge channel are of box-type design renders possible in particular the further embodiment in which the sum of the inside cross-sections of the heat transfer tubes is approximately equal to the respective inside cross-sections of the flue gas supply channel and the flue gas discharge channel, this helping to prevent any substantial cross-sectional changes from occurring in the heat exchanger, accompanied with the pressure drops thereby caused.

Further features, advantages and details of the invention will become apparent from the ensuing description of an exemplary embodiment, taken in conjunction with the drawing.

BRIEF DESCRIPTION OF THE DRAWING

FIG. 2 is a diagrammatic illustration of a vertical longitudinal section through a heating module of the baking oven according to the invention; and FIG. 3 is a diagrammatic illustration of a vertical cross-section through the baking oven according to the invention.

DESCRIPTION OF THE PREFERRED EMBODIMENT

Figure 1:
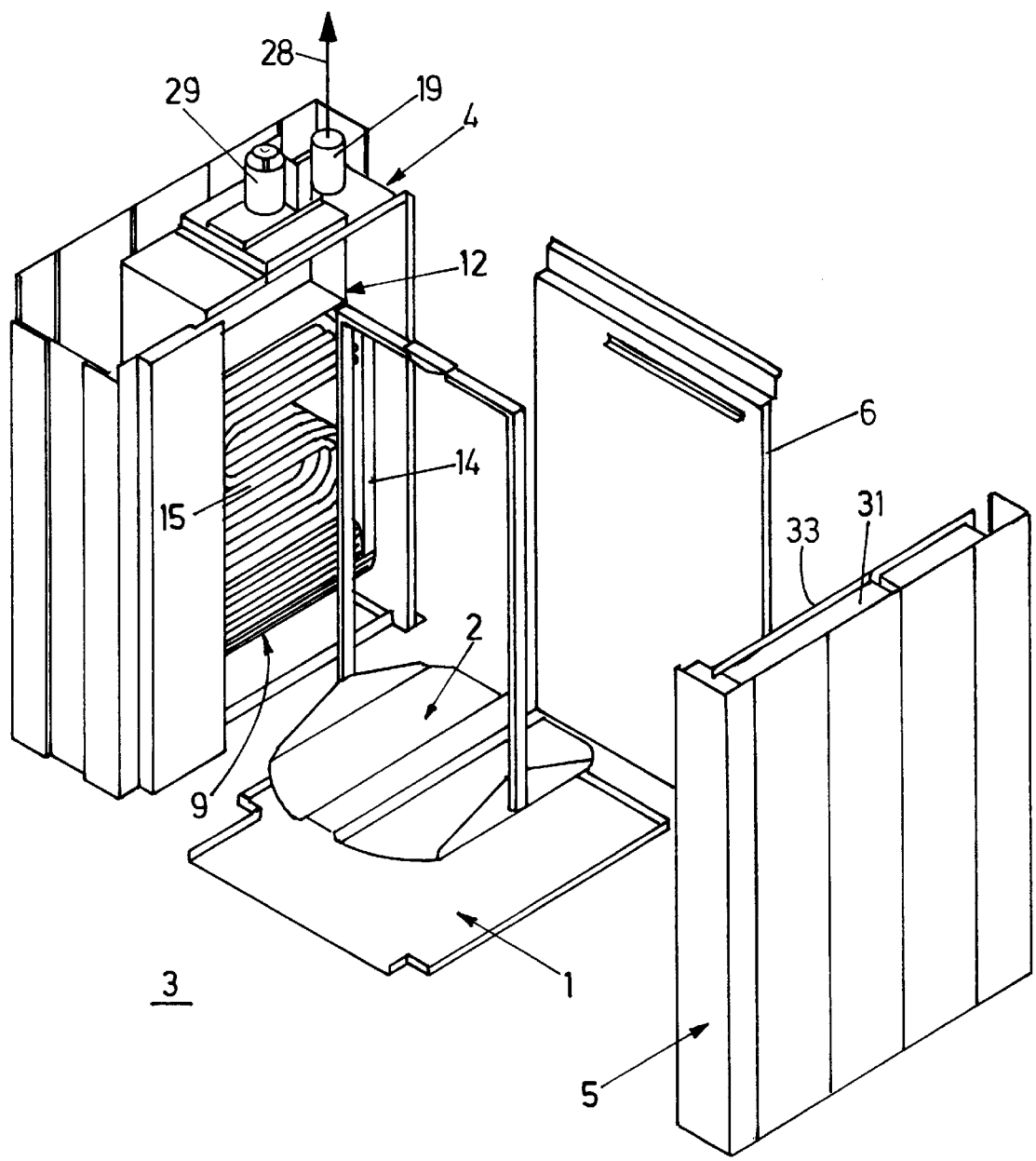
FIG. 1 is an exploded view, partially broken open, of a baking oven according to the invention.

The baking oven seen in the drawing is a rack oven. It is composed of individually transportable component parts which simultaneously constitute its side walls. A rotary table 2 rotating about a vertical axis of rotation is mounted rotatably drivably on a bottom plate 1; a movable rack with the goods to be baked is placed thereon. The oven further comprises a heating module 4 serving as a left side wall—seen from the front 3—and a vaporing module 5 serving as a right side wall—likewise seen from the front 3. Further, a back wall 6 is provided. The heating module 4 is connected to the vaporing module 5 by way of a heating duct module 7 serving as a cover plate and only diagrammatically outlined in FIG. 3. Towards the front 3, the baking chamber 8 defined by the heating module 4, the vaporing module 5, the back wall 6, bottom plate 1 and heating duct module 7 and containing the rotary table 2 is closed by a front door (not shown), which can be opened for the movable rack to move in or out.

A burner module 9 is situated in the lower portion of the heating module 4, comprising a combustion chamber 13 and a burner 10. The combustion chamber 13 is releasably mounted on the heating module 4 by means of screws 13a in the vicinity of the front 3, i.e. in vicinity to the burner 10. The hot flue gases 11 produced by the burner 10, which are roughly outlined by a flame in FIG. 2, are led through a cross-counterflow heat exchanger 12 where they largely give the heat contained in them off to the re-circulation air used for baking.

At its end turned away from the burner 10, the horizontally positioned combustion chamber 13 of the burner module 9 is topped by a flue gas supply channel 14 of box-type design, on the lower end of which, i.e. the end turned away from the combustion chamber 13, a bunch of S-shaped heat transfer tubes 15 is mounted. The heat transfer tubes 15, by their upper horizontal leg 16, are fixed to the supply channel 14 by welding and connected to the interior thereof. The single-piece heat transfer pipes 15 are guided downwards, their lower, equally horizontal leg 17 being joined by welding to an equally box-type flue gas discharge channel 18 and connected to the interior thereof. The flue gas discharge channel 18 guided vertically upwards beyond the upper legs 16 of the heat transfer tubes 15 where a flue gas tube 19 extends from it which is channeled through, and out of, the upper side 20 of the heating module 4 where it is guided for free vertical displacement in a slide bearing 21.

Air inlet openings 23 are formed directly above the bottom plate 1 in the baking chamber wall 22 which delimits the heating module 4 towards the baking chamber 8; coming from the baking chamber 8, the re-circulation air serving for heating purposes may enter the re-circulation-air heating chamber 24 formed in the heating module 4. Corresponding to the arrows of flow direction 25, this re-circulation air is guided around the combustion chamber 13 and through the heat exchanger 12, the re-circulation air flowing crosswise, i.e. in a cross flow, towards the lower legs 17, the central legs 26 and the upper legs 16 of the S-shaped heat transfer tubes 15. Additional guiding plates 27 can be provided in the re-circulation-air heating chamber 24 for the re-circulation air to be guided through the bunch of heat transfer tubes 15.

The flue gases 11 produced in the burner module 9 flow in accordance with the arrows of flow direction 28 from the combustion chamber 13 into the flue gas supply channel 14 where they flow upwards into the upper legs 16 of the heat transfer tubes 15. In these tubes they flow through the upper legs 16, the central legs 26 and the lower legs 17, in each case transversely to the re-circulation air, but on the whole they flow downwardly towards the latter. In vicinity to the combustion chamber 13, the flue gases 11 then enter the flue gas discharge channel 18, therein flowing upwards and through the flue gas tube 19 into a chimney (not shown).

By means of a re-circulation air blower 29 disposed in the upper side 20 of the heating module 4, the re-circulation air is sucked from the baking chamber 8 into the heating chamber 24 and pressed through the ducts 30 formed in the heating duct module 7 into supply channels 31 in the vaporing module 5. From these supply channels 31 the heated re-circulation air 31 enters the baking chamber 8 by large-area passage through air-outlet openings 32. These air-outlet openings 32 are formed in the baking chamber wall 33, defining the baking chamber 8, of the vaporing module 5. After its passage through the baking chamber 8 and corresponding dissipation of heat to the goods to be baked which are located there, the re-circulation air again enters the re-circulation-air heating chamber 24 of the heating module 25 in the way described above through the air-inlet openings 23.

The cross-counterflow heat exchanger 12, which consists of the flue gas supply channel 14, the heat transfer tubes 15, the flue gas discharge channel 18 and the flue gas tube 19, is fixed to be stationary only at a single spot so that it may move freely in all the coordinate directions of a Cartesian coordinate system. This single fixing spot 34 is located where the combustion chamber 13 passes into the flue gas supply channel 14. By means of a slide support 35, the flue gas discharge channel 18 is supported on the combustion chamber 13 for displacement in the direction thereof. The flue gas tube 19 is vertically freely displaceable by way of the slide bearing 21. For the reasons specified, the heat exchanger 12 can expand freely in all the three coordinate directions. Due to their S-shaped design, the heat transfer tubes 15 are virtually resilient, as a result of which it is possible that varying heat expansions which occur in the heat exchanger 12 itself can be compensated by elastic deformation. Since only the ends of the heat transfer tubes 15 are connected by welding to the supply channel 14 and the discharge channel 18, manufacturing and testing expenditure is low; moreover, no weld seam fissuring will occur due to the resilient design of the heat exchanger 12 and its free displaceability in all the coordinate directions. The pressure drop is low in the heat transfer tubes 15 curved in the shape of an S. The structure is extraordinarily compact.

As can be seen in FIGS. 2 and 3, the sum of the inside cross-sections of all the heat transfer tubes 15 on the one hand and of the flue gas supply channel 14 and the flue gas discharge channel 18, respectively, are approximately equal so that no cross-sectional changes occur in the way the flue gas takes that would lead to pressure drops of the flue gas. The total inside cross-section of the heat transfer tubes 15 is determined by their number z and their inside diameter d. The inside cross-section of the supply channel 14 and the discharge channel 18 is determined by their width a and their depth b, it being assumed to simplify matters in the present case that these dimensions are identical for the supply channel 14 on the one hand and the discharge channel 18 on the other. Consequently, $z \times d^2 \times \pi/4 \approx a \times b$ applies.

Of course the modules and walls externally defining the baking oven are provided with a thermal insulation as is general practice, which is however not shown for clarity reasons.

What is claimed is:

1. A baking oven, comprising
   a baking chamber (8),
   a re-circulation air heater in the baking oven which comprises
   a burner (10) with a combustion chamber (13), and
   a heat exchanger (12) disposed downstream of the combustion chamber (13) in the way of the re-circulation air,
   wherein the heat exchanger (12) is a cross-counterflow heat exchanger (12) having serpentine heat transfer tubes (15) which are connected to a flue gas supply channel (14) connected to the combustion chamber (13) and to a flue gas discharge channel (18), and
   wherein the cross-counterflow heat exchanger (12), which substantially comprises the flue gas supply channel (14), the heat transfer tubes (15) and the flue gas discharge channel (18), is fixed only at one fixing spot (34) in the baking oven, wherein the cross-counterflow heat exchanger is free to move relative to the fixing spot in each coordinate direction of a Cartesian coordinate system.

2. A baking oven according to claim 1, wherein the cross-counterflow heat exchanger (12) is fixed only at the one fixing spot (34) by the flue gas supply channel (14) engaged to the cross-counter flow heat exchanger (12).

3. A baking oven according to claim 1, wherein the heat transfer tubes (15), close to each other, are connected to one of the flue gas supply channel (14) and the flue gas discharge channel (18).

4. A baking oven according to claim 1, wherein the cross-counterflow heat exchanger (12) is additionally supported by at least one slide bearing (21, 35) on the baking oven.

5. A baking oven according to claim 1, wherein each of the heat transfer tubes (15) is of one-piece design.

6. A baking oven according to claim 1, wherein the heat transfer tubes (15) are curved in the shape of an S.

7. A baking oven according to claim 1, wherein at least one of the flue gas supply channel (14) and the flue gas discharge channel (18) are of box-type design.

8. A baking oven according to claim 1, wherein the heat transfer tubes (15) and the flue gas supply channel (14) and the flue gas discharge channel (18) each have an inside cross-section and wherein the sum of the inside cross-sections of the heat transfer tubes (15) is approximately equal to the respective inside cross-sections of the flue gas supply channel (14) and the flue gas discharge channel (18).

9. A baking oven according to claim 1, wherein a flue gas tube (19) discharges from the flue gas discharge channel (14).

10. A baking oven according to claim 1, wherein the one fixing spot (34) is located where the combustion chamber passes into the flue gas supply channel (14).

\* \* \* \* \*